(12) United States Patent
Hong et al.

(10) Patent No.: US 9,680,534 B2
(45) Date of Patent: *Jun. 13, 2017

(54) WIDEBAND NEAR FIELD COMMUNICATION METHOD

(71) Applicant: ELECTRONICS AND TELECOMMUNICATIONS RESEARCH INSTITUTE, Daejeon (KR)

(72) Inventors: Seung Eun Hong, Daejeon (KR); Kap-Seok Chang, Daejeon (KR); Hyoung-Jin Kwon, Daejeon (KR); Yong Sun Kim, Daejeon (KR); Woo-Yong Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,202

(22) Filed: Aug. 3, 2015

(65) Prior Publication Data

US 2015/0341107 A1    Nov. 26, 2015

Related U.S. Application Data

(63) Continuation of application No. 13/582,650, filed as application No. PCT/KR2011/001509 on Mar. 4, 2011, now Pat. No. 9,118,360.

(30) Foreign Application Priority Data

Mar. 5, 2010  (KR) .................. 10-2010-0019807
May 14, 2010  (KR) .................. 10-2010-0045444

(51) Int. Cl.
 H04B 7/155  (2006.01)
 H04B 7/04   (2017.01)
 (Continued)

(52) U.S. Cl.
 CPC ......... *H04B 5/0081* (2013.01); *H04B 7/0408* (2013.01); *H04B 7/15592* (2013.01);
 (Continued)

(58) Field of Classification Search
 None
 See application file for complete search history.

(56) References Cited

U.S. PATENT DOCUMENTS

2008/0123574 A1    5/2008  Sandhu et al.
2009/0303930 A1   12/2009  Ashley
(Continued)

FOREIGN PATENT DOCUMENTS

KR   WO 2009064105 A2 *  5/2009  ............ H04W 40/02
KR   WO 2009072825 A2 *  6/2009  ............ H04L 45/22
(Continued)

OTHER PUBLICATIONS

Abu-Surra et al ,Relay operation in IEEE 802.11ad, May 2010, slide 1-81.*
(Continued)

*Primary Examiner* — Vinncelas Louis
(74) *Attorney, Agent, or Firm* — Rabin & Berdo, P.C.

(57) ABSTRACT

A method for performing a wideband short-range wireless communication which may use a directional antenna in a millimeter wave band, and the method for wideband short-range wireless communication according to an embodiment may determine a change of a relay operation type based on a link quality between a source node and a relay node, a link quality between the relay node and the destination node, and a link quality between the source node and the destination
(Continued)

node, transmit a relay operation change (ROC) request message in response to a determination of the change of the relay operation type, and receive an ROC response message corresponding to the ROC request message.

20 Claims, 11 Drawing Sheets

(51) Int. Cl.
  *H04W 24/10* (2009.01)
  *H04B 5/00* (2006.01)
  *H04B 7/0408* (2017.01)
  *H04W 36/08* (2009.01)
  *H04L 12/28* (2006.01)
  *H04W 40/22* (2009.01)
  *H04W 76/02* (2009.01)
  *H04W 36/00* (2009.01)
  *H04W 36/30* (2009.01)
  *H04W 88/08* (2009.01)

(52) U.S. Cl.
  CPC ........... *H04W 24/10* (2013.01); *H04W 36/08* (2013.01); *H04L 12/28* (2013.01); *H04W 36/0005* (2013.01); *H04W 36/30* (2013.01); *H04W 40/22* (2013.01); *H04W 76/023* (2013.01); *H04W 88/085* (2013.01)

(56) References Cited

U.S. PATENT DOCUMENTS

| | | |
|---|---|---|
| 2010/0008247 A1 | 1/2010 | Kwon et al. |
| 2011/0145421 A1 | 6/2011 | Yao et al. |
| 2012/0087300 A1 | 4/2012 | Seok |

FOREIGN PATENT DOCUMENTS

| | | |
|---|---|---|
| WO | WO-2007021602 A1 | 2/2007 |
| WO | WO-2009/059006 A1 | 5/2009 |
| WO | WO-2009064105 A2 | 5/2009 |
| WO | WO-2009/072825 A2 | 6/2009 |

OTHER PUBLICATIONS

Kraemer et al , Part 11: Wireless LAN Medium Access Control (MAC) and Physical Layer (PHY) Specifications Amendment 3: Enhancements for Very High Throughput in the 60 GHz Band, IEEE, p. 1-598.*

Abu-Surra et al, Relay operation in IEEE 802.11 ad, May 2010.

Zhou Lan et al., "Achieving Gbps Throughput for Millimeter-Wave WPAN with an Anti-Blocking Scheme Using Deflection Routing", 2009 IEEE 70th, Vehicular Technology Conference Fall, Sep. 20-23, 2009, pp. 1-6.

Zhou Lan et al., "Relay with deflection routing for effective throughput improvement in Gbps millimeter-wave WPAN systems", IEEE Journal on Selected Areas in Communications, Oct. 2009, pp. 1453-1465, vol. 27, No. 8.

* cited by examiner

FIG. 2C

| ~230 | ~240 | ~250 |
|---|---|---|
| LINK-COOPERATING | RELAY-LINK | RESERVED |
| B0 | B1 | B2-B7 |

WIDEBAND NEAR FIELD COMMUNICATION METHOD

CROSS-REFERENCE TO THE RELATED APPLICATIONS

This is a continuation of U.S. application Ser. No. 13/582,650, filed on Sep. 4, 2012, which is, in turn, a national stage of PCT application number PCT/KR2011/001509, filed Mar. 4, 2011. Furthermore, this application claims the foreign priority benefit of Korean application number 10-2010-0045444, filed May 14, 2010 and Korean application number 10-2010-0019807, filed Mar. 5, 2010. The disclosures of these prior applications are incorporated herein by reference.

TECHNICAL FIELD

The present invention relates to an apparatus and method for wideband short-range wireless communication using a directional antenna in a millimeter wave band, and more particularly, relates to an apparatus and method for relaying a communication signal when a directional antenna is used in a wireless system supporting a reservation-based channel access such as a Wireless Local Area Network (WLAN) or a Wireless Personal Area Network (WPAN).

BACKGROUND ART

A millimeter wave band corresponding to 57 to 66 GHz may ease a worldwide shortage of frequency resources.

A millimeter wave has unique properties of a short wavelength, a high frequency, a wideband, a large amount of exchange with atmospheric components, and the like. The millimeter wave has merits of a high data transmission rate obtained by using an ultra wideband, a high resistance against interference in proximity due to a high straightness, an excellent security, an easiness of reusing a frequency, and the like. A short wavelength of the millimeter wave may enable various devices to be miniaturized and less weighted.

In contrast, the millimeter wave has demerits of a short propagation length due to an absorption by an oxygen molecule and due to a phenomenon of rain attenuation, and a line of sight may be secured due to a characteristic of straightness.

To make up for the demerits of the millimeter wave, a directional antenna may be used. The directional antenna may concentrate power in a predetermined direction to enhance an efficiency of an antenna gain, thereby extending a communication range. However, even though the directional antenna is used, when the line of sight is not secured, an attenuation loss of a signal may be great due to a transmission length of the signal, a reflection of the signal, and a penetration through a barrier of the signal.

Accordingly, a technology may be used to perform a communication while minimizing an attenuation loss of a signal even when the line of sight is not secured.

DISCLOSURE OF INVENTION

Technical Goals

An aspect of the present invention provides an apparatus and method for changing a relay operation type from a link switching type to a link cooperating type vice-versa according to a channel status of a relay link and a direct link.

Another aspect of the present invention provides an apparatus and method for effectively preparing for a variable wireless channel state by transmitting a data frame in a link switching type or in a link cooperating type according to a quality of a link formed among a source node, a relay node, and a destination node.

Still another aspect of the present invention provides an apparatus and method for reducing a loss of antenna gain of a destination node occurring in a link cooperating type by changing a data frame transmission scheme from the link cooperating type to a link switching type according to a quality of a link formed among a source node, a relay node, and the destination node.

Technical Solutions

According to an aspect of the present invention, there is provided a method for wideband short-range wireless communication, the method including determining a change of a relay operation type based on a link quality between a source node and a relay node, a link quality between the relay node and the destination node, and a link quality between the source node and the destination node, transmitting a relay operation change (ROC) request message in response to a determination of the change of the relay operation type, and receiving an ROC response message corresponding to the ROC request message.

The ROC request message may correspond to an action frame including a medium access control (MAC) header field, an action category field, an action value field, a dialog token field, and a relay operation type field.

The ROC response message may correspond to an action frame including an MAC header field, an action category field, an action value field, a dialog token field, and a status code field.

The relay operation type field may include a link cooperating bit field, a relay link bit field, and reserved bits.

The link cooperating bit field may be set to "1" to indicate a link cooperating type and may be set to "0" to indicate a link switching type, and the relay link bit field may have a valid value when a value of the link cooperating bit field is set to "0" may be set to "1," when a link switching is started at a relay link, and may be set to "0" when a link switching is performed at a direct link.

The determining may include changing the relay operation type to a link switching type when a signal is incapable of being transmitted through a direct link or a link quality deteriorates in comparison with a predetermined criterion at the direct link while operating in a link cooperating type, the transmitting may include transmitting the ROC request message to the relay node, and the receiving may include receiving the ROC response message, including whether the change of the relay operation type of the destination node and the relay node is approved, from the relay node.

The ROC request message may include a relay operation type field where a value of a link cooperating bit field is set to "0" and a relay link bit field is set to "1" and the ROC response message may include a status code field where a predetermined bit is set to indicate whether the change of the relay operation type of the destination node and the relay node is approved.

The method may further include transmitting a data frame to the relay node when the change of the relay operation type is approved.

The determining may include changing the relay operation type to a link switching type when a signal is incapable of being transmitted through a relay link or a link quality deteriorates in comparison with a predetermined criterion at the relay link while operating in a link cooperating type, the transmitting may include transmitting the ROC request message to the destination node, and the receiving may include receiving the ROC response message, including whether the change of the relay operation type is approved, from the destination node.

The ROC request message may include a relay operation type field where a value of a link cooperating bit field is set to "0" and a relay link bit field is set to "0" and the ROC response message may include a status code field where a predetermined bit is set to indicate whether the change of the relay operation type of the destination node is approved.

The method may further include transmitting a data frame to the destination node when the change of the relay operation type is approved.

The determining may include changing the relay operation type to a link cooperating type while operating in a link switching type, the transmitting may include transmitting the ROC request message to the relay node, and the receiving may include receiving the ROC response message, including whether the change of the relay operation type of the destination node and the relay node is approved, from the relay node.

The ROC request message may include a relay operation type field where a value of a link cooperating bit field is set to "1" and the ROC response message may include a status code field where a predetermined bit is set to indicate whether the change of the relay operation type of the destination node and the relay node is approved.

The method may further include transmitting a data frame to the relay node and the destination node based on a scheme of the link cooperating type when the change of the relay operation type is approved.

The destination node may have an antenna pattern set to be simultaneously directed to the relay node and the source node to simultaneously receive data frames from the source node and the relay node.

The method may further include determining whether a transmission time-point adjustment (TPA) is performed among the source node, the relay node, and the destination node, and performing the TPA among the source node, the relay node, and the destination node when the TPA is not performed.

The method may further include receiving a link measurement report frame from the relay node, wherein the link measurement report frame includes a first link margin element, indicating link quality information between the source node and the relay node, and a second link margin element, indicating link quality information between the relay node and the destination node.

The method may further include changing a modulation and coding scheme used for transmitting a frame to the relay node and the destination node based on the link quality information between the source node and the relay node and the link quality information between the relay node and the destination node.

According to an aspect of the present invention, there is provided a method for wideband short-range wireless communication, the method including receiving an ROC request message from a source node in response to a determination of a change of a relay operation type, transmitting the received ROC request message to a destination node, receiving an ROC response message, corresponding to the ROC request message, from the destination node, and transmitting the received ROC response message to the source node.

The transmitting to the destination node may include transmitting the ROC request message by setting an MAC address of a relay node to a transmitter address of an MAC header and by setting an MAC address of the destination node to a receiver address of the MAC header.

The method may further include measuring a link quality between the source node and a relay node and a link quality between the relay node and the destination node, and transmitting, to the source node, a link measurement report frame including a first link margin element indicating link quality information between the source node and the relay node and a second link margin element indicating link quality information between the relay node and the destination node.

According to an aspect of the present invention, there is provided a method for wideband short-range wireless communication, the method including receiving an ROC request message in response to a determination of a change of a relay operation type, and transmitting an ROC response message corresponding to the ROC request message.

The receiving may include receiving the ROC request message from a relay node when the relay operation type is determined to be changed from a link cooperating type to a link switching type due to an incapability of transmitting a signal through a direct link between a source node and a destination node or due to a deterioration in a link quality in comparison with a predetermined criterion at the direct link, and receiving the ROC request message from the source node when the relay operation type is determined to be changed from a link cooperating type to a link switching type due to an incapability of transmitting a signal through a relay link among the source node, the relay node, and the destination node or due to a deterioration in a link quality in comparison with a predetermined criterion at the relay link.

The receiving may include receiving the ROC request message from a relay node when the relay operation type is determined to be changed from a link switching type to a link cooperating type.

The transmitting may include transmitting the ROC response message to a relay node when the relay operation type is determined to be changed from a link cooperating type to a link switching type due to an incapability of transmitting a signal through a direct link between a source node and a destination node or due to a deterioration in a link quality in comparison with a predetermined criterion at the direct link, and transmitting the ROC response message to the source node when the relay operation type is determined to be changed from a link cooperating type to a link switching type due to an incapability of transmitting a signal through a relay link among the source node, the relay node, and the destination node or due to a deterioration in a link quality in comparison with a predetermined criterion at the relay link.

The transmitting may include transmitting the ROC response message to a relay node when the relay operation type is determined to be changed from a link switching type to a link cooperating type.

According to an aspect of the present invention, there is provided an apparatus for wideband short-range wireless communication, the apparatus including a control unit to determine a change of a relay operation type based on a link quality between a source node and a relay node, a link quality between the relay node and the destination node, and a link quality between the source node and the destination node, a transmitter to transmit an ROC request message in response to a determination of the change of the relay operation type, and a receiver to receive an ROC response message corresponding to the ROC request message.

The control unit may determine to change the relay operation type to a link switching type when a signal is incapable of being transmitted through a direct link or a link quality deteriorates in comparison with a predetermined criterion at the direct link while operating in a link cooperating type, the transmitter may transmit the ROC request message to the relay node, and the receiver may receive the ROC response message, including whether the change of the relay operation type of the destination node and the relay node is approved, from the relay node.

The transmitter may transmit a data frame to the relay node when the change of the relay operation type is approved.

The control unit may determine to change the relay operation type to a link switching type when a signal is incapable of being transmitted through a relay link or a link quality deteriorates in comparison with a predetermined criterion at the relay link while operating in a link cooperating type, the transmitter may transmit the ROC request message to the destination node, and the receiver may receive the ROC response message, including whether the change of the relay operation type is approved, from the destination node.

The transmitter may transmit a data frame to the destination node when the change of the relay operation type is approved.

The control unit may determine to change the relay operation type to a link cooperating type while operating in a link switching type, the transmitter may transmit the ROC request message to the relay node, and the receiver may receive the ROC response message, including whether the change of the relay operation type of the destination node and the relay node is approved, from the relay node.

The control unit may reuse an existing value of a beamforming parameter and a value of a TPA parameter in response to a determination of a change of the relay operation type from the link switching type to the link cooperating type before a period of time, set to a timer, passes and reperform a beamforming process and a TPA process in response to a determination of a change of the relay operation type from the link switching type to the link cooperating type after a period of time, set to the timer, passes.

The transmitter may transmit a data frame to the relay node and the destination node based on the link cooperating type scheme when the change of the relay operation type is approved.

The apparatus may further include a link quality measurement unit to measure the link quality between the source node and the relay node, the link quality between the relay node and the destination node, and the link quality between the source node and the destination node.

Effect of the Invention

According to an aspect of the present invention, it is possible to change a relay operation type from a link switching type to a link cooperating type and vice versa according to a channel status of a relay link and a direct link.

According to an aspect of the present invention, it is possible to effectively prepare for a variable wireless channel state by transmitting a data frame in a link switching type or in a link cooperating type according to a quality of a link formed among a source node, a relay node, and a destination node.

According to an aspect of the present invention, it is possible to reduce a loss of antenna gain of a destination node occurring in a link cooperating type by changing a data frame transmission scheme from the link cooperating type to a link switching type according to a quality of a link formed among a source node, a relay node, and the destination node.

BRIEF DESCRIPTION OF DRAWINGS

FIGS. 2A, 2B, and 2C are diagrams illustrating an action frame of a relay operation change request message and a relay operation change response message used in a method for wideband short-range wireless communication.

BEST MODE FOR CARRYING OUT THE INVENTION

Figure 1:
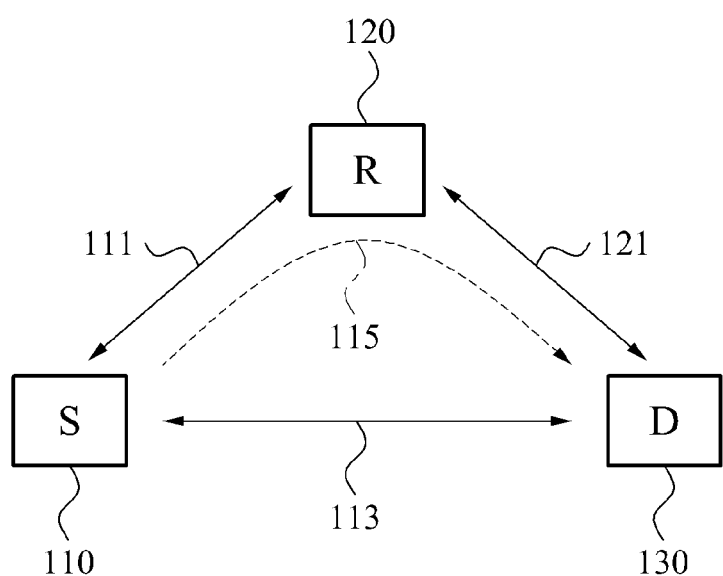
FIG. 1 is a diagram illustrating a wideband short-range wireless communication system according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

In a Wireless Local Area Network (WLAN) and a Wireless Personal Area Network (WPAN), a method for transmitting data in a contention scheme and a non-contention scheme may be provided. An access point (AP) or a personal basic service set control point (PCP) of the WLAN and a pico-net coordinator (PNC) of the WPAN may classify a time interval for transmitting data into a contention period and a non-contention period.

In the contention period, every apparatus of a network may be contention based on a carrier sense multiple access/collision avoidance (CSMA/CA) scheme to acquire a channel.

In the non-contention period, the AP, PCP, or PNC may use a polling scheme or a scheme of transmitting scheduling information to enable a predetermined terminal in a network to transmit data in a predetermined time interval of the non-contention period.

The present invention provides an apparatus and method for transmitting and receiving data and control information by changing a relay operation type by a source node, a relay node, and a destination node according to a signal quality status of a direct link between the source node and the destination node and a relay link of a source node-relay node-destination node in the non-contention period.

Hereinafter, the source node may indicate a node or a terminal starting transmission of a data frame. The relay node may indicate a node or a terminal receiving a data frame transmitted from the source node and transmitting the received data frame to the destination node. The destination node may indicate a node or a terminal to be a target of the data frame transmission.

The source node may transmit a data frame to the destination node through two types of a relay operation which may include a link switching type and a link cooperating type.

The link switching type may correspond to a scheme of transmitting a data frame using one of a direct link and a relay link, and transmitting a data frame using the other link by switching to the other link when a link being used has a problem. The problem may indicate a case where transmission of a signal is being blocked due to a barrier in the direct link or the relay link, or a case where a quality of a signal deteriorates below a predetermined level.

The link cooperating type may correspond to a scheme of transmitting a data frame using both of the direct link and the relay link. The source node may transmit a data frame to the destination node through the direct link, and the source may transmit the same data frame to the destination node through the relay link. The destination node may combine signals simultaneously received through two links and restore received data. When the relay link is used, the relay node located between the source node and the destination node may receive a data frame from the source node and transmit the data frame to the destination node and thus, a transmission time-point adjustment (TPA) may be performed to enable the destination node to simultaneously receive signals through two links.

In the link switching type, when a signal quality of the direct link and a signal quality of the relay link are relatively poor at the same time, a reception state at the destination node may not be improved even though a data transmission path is frequently changed.

In the link cooperating type, when one of the direct link and the relay link has a problem and the link cooperating type continues to be performed, the destination node may not receive data through a link having the problem and thus, an assigned time resource may be wasted. Since the destination node partially forms an antenna pattern in directions of the relay node and the source node to simultaneously receive the same data from the relay node and the source node, an antenna gain may be dispersed in two directions. Accordingly, a loss of antenna gain may occur with respect to a link having the problem between the direct link and the relay link.

Thus, the source node may transmit data appropriately using the link switching type or the link cooperating type depending on a case where the direct link or the relay link has a problem.

FIG. 1 is a diagram illustrating a wideband short-range wireless communication system according to an embodiment of the present invention.

In the present invention, a source node 110, a relay node 120, and a destination node 130 may perform a link switching function and a link cooperating function.

The source node 110 may request and acquire information, about the available relay node 120 used for performing a link switching or a link cooperating in a relation with the destination node 130, from an AP or PCP. In this instance, the AP or PCP may transfer the information about the relay node 120 to the destination node 130.

Referring to FIG. 1, when the source node 110 transmits data in a link switching type or a link cooperating type, the source node 110 may receive an acknowledgement response message (hereinafter, referred to as ACK frame) with respect to a reception of data from the destination node 130, and may confirm that data are properly transmitted to the destination node 130. In general, the destination node 130 may transmit the ACK frame to the source node 110 through a direct link 113.

When the ACK frame is not received continuously for a predetermined period of time from the destination node 130, the source node 110 may determine that a signal is blocked from being transmitted in the direct link 113 or a relay link 115, or a signal quality deteriorates below a predetermined level. The source node 110 may measure a quality of a link 111 between the source node 110 and the relay node 120, a quality of a link 121 between the relay node 120 and the destination node 130, and a quality of a link 113 between the source node 110 and the destination node 113. The source node 110 may determine a link having a problem based on whether the ACK frame is received and a result of measuring a signal quality of each link.

Each of the source node 110, the relay node 120, and the destination node 130 may perform different functions in the link switching type and the link cooperating type. Thus, signaling for changing an operation among the source node 110, the relay node 120, and the destination node 130 may be performed to change a relay operation type from the link switching type to the link cooperating type or from the link cooperating type to the link switching type.

As an example of signaling for changing an operation, the source node 110 may exchange a relay operation change (ROC) request message and an ROC response message with the relay node 120 and the destination node 130. Further examples of the signaling will be described with reference to FIG. 3 through FIG. 5.

Figure 2A:
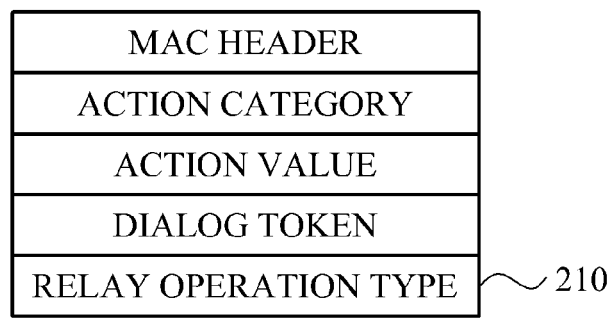
Figure 2B:
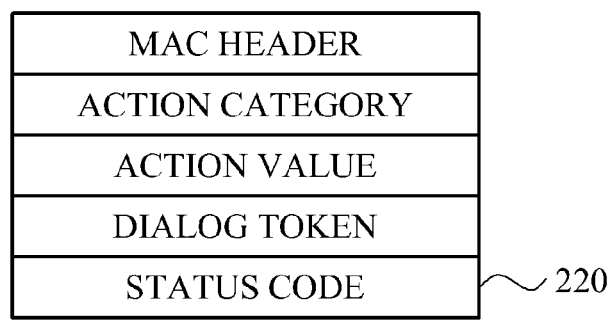

FIGS. 2A, 2B, and 2C are diagrams illustrating an action frame of an ROC request message and an ROC response message used in a method for wideband short-range wireless communication.

FIG. 2A illustrates an action frame configuring the ROC request message. The action frame may include a medium access control (MAC) header field, an action category field, an action value field, a dialog token field, and a relay operation type field 210.

The MAC header field may include a transmitter address of an apparatus for transmitting the ROC request message and a receiver address of an apparatus for receiving the ROC request message. The action category field may be set to a category performing wideband short-range wireless communication using a directional antenna, the action value field may be set to a value previously assigned to the ROC request, and the dialog token field may be set to a value other than "0." The relay operation type field 210 may indicate the link cooperating type or the link switching type, and will be further described with reference to FIG. 2C.

FIG. 2B illustrates an action frame configuring the ROC response message. The action frame may include an MAC header field, an action category field, an action value field, a dialog token field, and a status code field 220.

The MAC header field may include a transmitter address of an apparatus for transmitting the ROC request message and a receiver address of an apparatus for receiving the ROC request message. The action category field may be set to a category performing wideband short-range wireless communication using a directional antenna, the action value field may be set to a value previously assigned to the ROC response, and the dialog token field may be set to a value of a dial token field of the corresponding ROC request message.

The status code field 220 may indicate whether a change of the relay operation type of a relay node or a destination node is approved. Whether a change is approved may be expressed by being set to a predetermined value. As an example only, a value of "0" may be set when the change of the relay operation type is approved, and a value of "37" may be set when the change of the relay operation type is not approved. In a case of receiving the status code field 220, including whether the change of the relay operation type of the relay node and the destination node is approved, from the relay node, the status code field 220 where the change of the relay operation type is approved may be received only when both of the relay node and the destination node approve the change. When at least one of the relay node and the destination node rejects the change, the status code field 220 where the change of the relay operation type is rejected may be received.

FIG. 2C illustrates the relay operation type field 210 of the ROC request message. The relay operation type field 210 may include a link cooperating bit field 230, a relay link bit field 240, and reserved bits 250.

The relay operation type field 210 may correspond to a one-byte field including the link cooperating bit field 230, the relay link bit field 240, and the reserved bits 250.

The link cooperating bit field 230 may be set to "1" to indicate a link cooperating type and may be set to "0" to indicate a link switching type. The relay link bit field 240 may have a valid value when the link cooperating bit field 230 is set to "0" may be set to "1" when a link switching is started at a relay link, and may be set to "0" when a link switching is started at a direct link. The reserved bits 250 may correspond to bits previously prepared for additional use.

Figure 3:
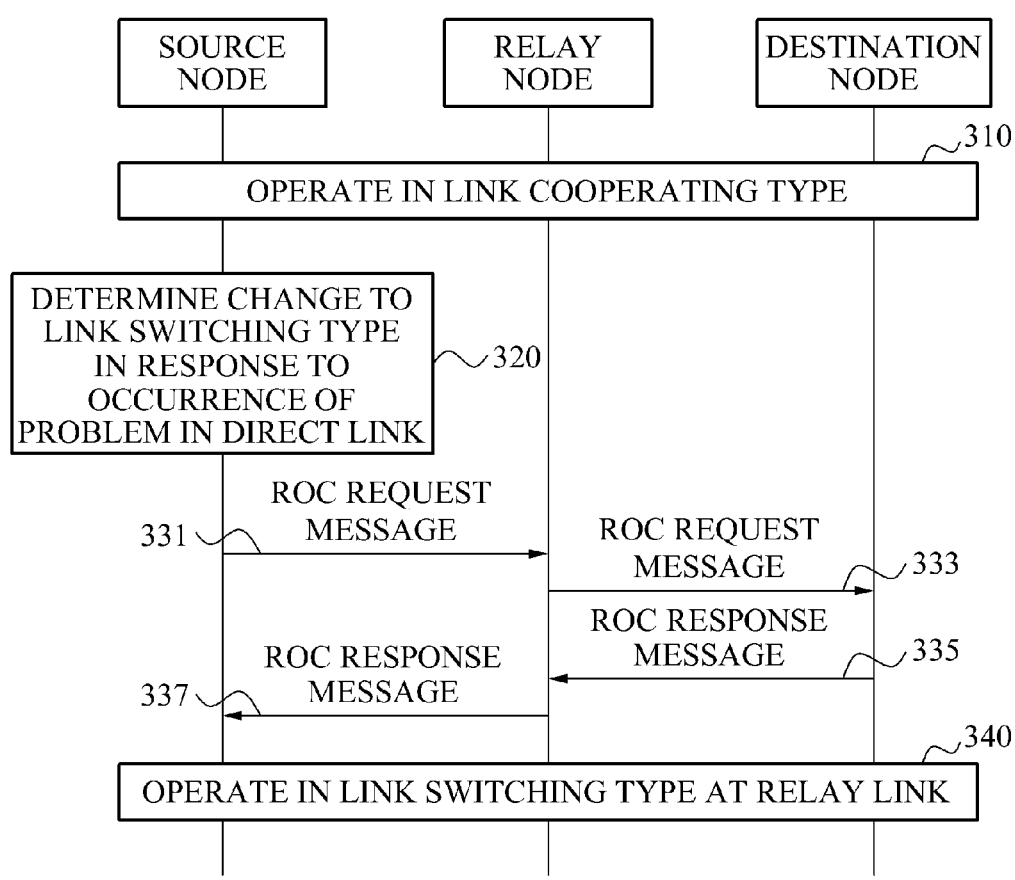
FIG. 3 is a flowchart illustrating an example of changing a relay operation type from a link cooperating type to a link switching type.

FIG. 3 is a flowchart illustrating an example of changing a relay operation type from a link cooperating type to a link switching type.

In operation 310, a source node, a relay node, and a destination node may operate in the link cooperating type.

In operation 320, in response to an occurrence of a problem at a direct link while operating in the link cooperating type, the source node may determine to change the relay operation type to the link switching type. In this instance, the problem occurring at the direct link may indicate a case where a signal is incapable of being transmitted between the source node and the destination node or deterioration of a link quality in comparison with a predetermined criterion. The source node may detect a problem in the direct link based on whether an ACK frame is received from the destination node and a measured link quality between the source node and the destination node.

In operation 331, the source node may perform signaling for changing an operation to enable the relay node and the destination node to operate in the link switching type. When the direct link has a problem, the source node may transmit an ROC request message to the relay node to use a relay link. In this instance, a link cooperating bit field may be set to "0" and a relay link bit field may be set to "1" in a relay operation type field of an action frame configuring the ROC request message since the relay operation type is change to the link switching type and a link switching is started in the relay link.

In operation 333, after the relay node receives the ROC request message, the relay node may transmit the received ROC request message to the destination node. After the relay node receives the message from the source node in a half duplex scheme, the relay node may transmit the received message to the destination node. The relay node may transmit the ROC request message by setting an MAC address of the relay node to a transmitter address of an MAC header and by setting an MAC address of the destination node to a receiver address of the MAC header.

In operation 335, the destination node may transmit an ROC response message, corresponding to the ROC request message, to the relay node. The ROC response message may include a status code field indicating whether a change of the relay operation type of the destination node is approved.

In operation 337, after the relay node receives the ROC response message, the relay node may transmit the received ROC response message to the source node. In this instance, the ROC response message transmitted to the source node may include a status code field indicating whether a change of the relay operation type of the destination node and the relay node is approved. When both of the destination node and the relay node approve the change, a predetermined bit approving the change of the relay operation type may be set to the status code field. When at least one of the destination node and the relay node rejects the change, another predetermined bit rejecting the change of the relay operation type may be set to the status code field.

In operation 340, the source node may determine whether the change of the relay operation type of the destination node and the relay node is approved through the ROC response message. When the destination node and the relay node approve the change of the relay operation type, the source node may transmit a data frame to the relay node. The source node, the relay node, and the destination node may operate in the link switching type at the relay link. When at least one of the destination node and the relay node rejects the change of the relay operation type, the source node may continue to operate in the link cooperating type. Thereafter, signaling for changing a relay operation may be performed according to a predetermined condition.

Figure 4:
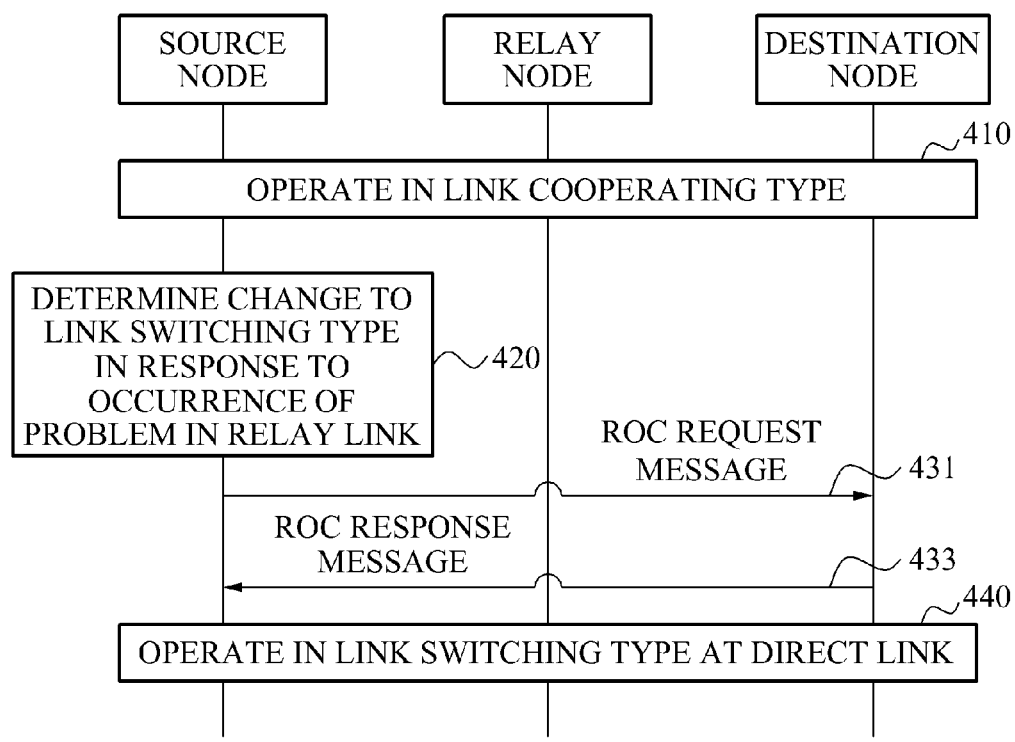
FIG. 4 is a flowchart illustrating another example of changing a relay operation type from a link cooperating type to a link switching type.

FIG. 4 is a flowchart illustrating another example of changing a relay operation type from a link cooperating type to a link switching type.

In operation 410, a source node, a relay node, and a destination node may operate in the link cooperating type.

In operation 420, in response to an occurrence of a problem in a relay link while operating in the link cooperating type, the source node may determine to change the relay operation type to the link switching type. In this instance, the problem occurring in the relay link may indicate a case where a signal is incapable of being transmitted between the source node and the relay node or between the relay node and the destination node or a case where a link quality between the source node and the relay node or a link quality between the relay node and the destination node deteriorates in comparison with a predetermined level. The source node may detect a problem in the relay link based on whether an ACK frame is received from the destination node, a measured link quality between the source node and the relay node, and a measured link quality between the relay node and the destination node.

In operation 431, the source node may perform signaling for changing an operation to enable the destination node to operate in the link switching type. When the relay link has a problem, the source node may transmit an ROC request message to the destination node to use a direct link. In this instance, a link cooperating bit field may be set to "0" and a relay link bit field may be set to "1" in a relay operation type field of an action frame configuring the ROC request message since the relay operation type is changed to the link switching type and a link switching is started in the direct link.

In operation 433, the destination node may transmit an ROC response message corresponding to the ROC request message to the relay node. The ROC response message may include a status code field indicating whether the change of the relay operation type of the destination node is approved. When the destination node approves the change, a predetermined bit approving the change of the relay operation type may be set to the status code field. When the destination node rejects the change, another predetermined bit rejecting the change of the relay operation type may be set to the status code field.

In operation 440, the source node may determine whether the change of the relay operation type of the destination node is approved through the ROC response message. When the destination node approves the change of the relay operation type, the source node may transmit a data frame to the destination node. The source node and the destination node may operate in the link switching type at the direct link. When the destination node rejects the change of the relay operation type, the source node may continue to operate in the link cooperating type. Thereafter, signaling for changing the relay operation may be performed according to a predetermined condition.

Figure 5:
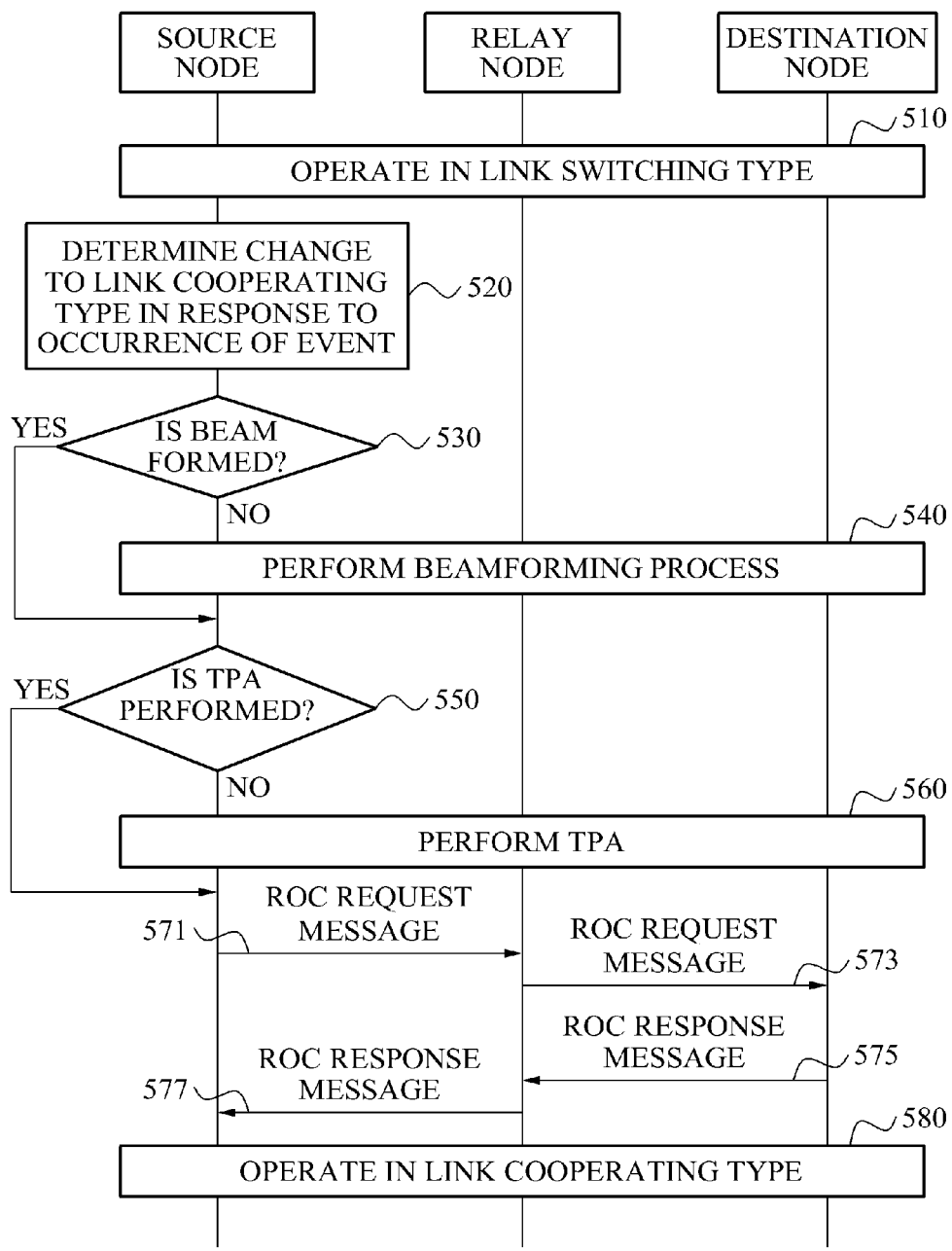
FIG. 5 is a flowchart illustrating an example of changing a relay operation type from a link switching type to a link cooperating type.

FIG. 5 is a flowchart illustrating an example of changing a relay operation type from a link switching type to a link cooperating type.

In operation 510, a source node, a relay node, and a destination node may operate in a link switching type.

In operation 520, in response to an occurrence of an event while operating in the link switching type, the source node may determine to change the relay operation type to the link cooperating type. In this instance, the occurrence of an event may include a passage of time predetermined to a timer. When a predetermined period of time set to the timer passes, the source node may determine to change the relay operation type to the link cooperating type. In a case, where a link switching between a relay link and a direct link occurs frequently in comparison with a predetermined level, may be included. In the case, where a link switching between a relay link and a direct link occurs frequently in comparison with a predetermined level, may indicate that a link quality of the relay link and a link quality of the direct link are poor and thus, a signal having a relatively high quality may be received through a change to the link cooperating type.

The source node may determine a change of the relay operation type based on whether an ACK frame is received from the destination node, a measured link quality between the source node and the relay node, a measured link quality between the relay node and the destination node, and a measured link quality between the source node and the destination node.

The source node may measure a link quality of the direct link not being used or the relay link while operating in the link switching type. When a quality of a link not being used is greater than or equal to a predetermined value as a result of the measurement, the relay operation type may be determined to be changed to the link cooperating type.

In operation 530, the source node may determine whether a beam is formed, using a directional antenna, to operate in the link cooperating type among the source node, the relay node, and the destination node. Since the source node, the relay node, and the destination node may communicate using the directional antenna, a beamforming process may be used between the source node and the relay node and among the source node, the relay node, and the destination node as a means for performing a communication.

In operation 540, when a beam is not formed, the source node, the relay node, and the destination node may perform a beamforming process among the source node, the relay node, and the destination node.

In operation 550, the source node may determine whether a TPA among the source node, the relay node, and the destination node is performed. To operate in the link cooperating type among the source node, the relay node, and the destination node, the TPA may be successfully performed.

The TPA may correspond to a process for adjusting a frame transmission time-point of the source node and the relay node to enable a frame transmitted from the source node and a frame transmitted from the relay node are received at the destination node simultaneously or within a cyclic prefix. The frame transmission time-point may be adjusted based on a propagation delay time between the source node and the relay node, a propagation delay time between the destination node and the source node, and a propagation delay time between the destination node and the relay node.

The process for adjusting a frame transmission time-point may include a process of adjusting a frequency offset of the source node and the relay node.

In operation 560, when the process for adjusting a frame transmission time-point is not performed, the source node, the relay node, and the destination node may perform the process for adjusting a frame transmission time-point among the source node, the relay node, and the destination node.

In operation 571, the source node may perform a signaling for changing an operation to enable the relay node and the destination node to operate in the link cooperating type. Since the source node may use both of the direct link and the relay link in the link cooperating type, the source node may transmit an ROC request message to the relay node to use the relay link. In this instance, a link cooperating type field may be set to "1" in the relay operation type field of an action frame configuring the ROC request message.

In operation 573, after the relay node receives the ROC request message, the relay node may transmit the received ROC request message to the destination node. The relay node may receive the message from the source node in a half-duplex scheme, and then transmit the received message to the destination node. The relay node may transmit the ROC request message by setting an MAC address of the relay node to a transmitter address of an MAC header and by setting an MAC address of the destination node to a receiver address of the MAC header.

In operation 575, the destination node may transmit an ROC response message corresponding to the ROC request message to the relay node. The ROC response message may include a status code field indicating whether a change of the relay operation type of the destination node is approved.

In operation 577, after the relay node receives the ROC response message, the relay node may transmit the received ROC response message to the source node. In this instance, the ROC response message transmitted to the source node may include a status code field indicating whether a change of the relay operation type of the destination node and the relay node is approved. When both of the destination node and the relay node approve the change, a predetermined bit approving the change of the relay operation type may be set to the status code field. When at least one of the destination node and the relay node rejects the change, another predetermined bit rejecting the change of the relay operation type may be set to the status code field.

In operation 580, the source node may determine whether the change of the relay operation type of the destination node and the relay node is approved through the ROC response message. When the destination node and the relay node approve the change of the relay operation type, the source node may transmit a data frame to the relay node and the destination node. The source node may transmit the same data frame to the relay node and the destination node according to a time adjusted by the TPA. Thus, the destination node may simultaneously receive the same data frame from the source node and the relay node. In this instance, the destination node may set an antenna pattern of the destination node to be simultaneously directed to the source node and the relay node to simultaneously receive a data frame from the source node and the relay node. The antenna pattern of the destination node may be previously set to be simultaneously directed to the source node and the relay node in operation 540.

When at least one of the destination node and the relay node rejects the change of the relay operation type, the source node may continue to operate in the link switching type. Thereafter, a signaling of changing the relay operation may be performed according to a predetermined condition.

Figure 6:
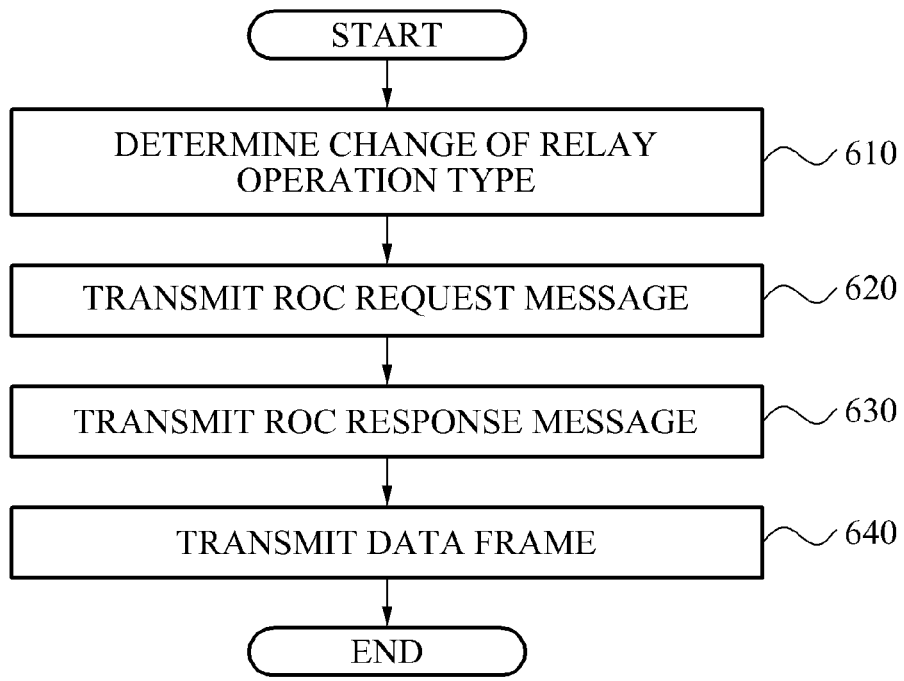
FIG. 6 is a flowchart illustrating a method for wideband short-range wireless communication viewed from a source node.

FIG. 6 is a flowchart illustrating a method for wideband short-range wireless communication viewed from a source node. In FIG. 6, an apparatus for wideband short-range wireless communication may correspond to the source node.

In operation 610, the apparatus for wideband short-range wireless communication may determine a change of a relay operation type. When the apparatus for wideband short-range wireless communication does not receive an ACK frame for a predetermined period of time, the apparatus for wideband short-range wireless communication may determine to change the relay operation type based on a link quality between the source node and a relay node, a link quality between the relay node and the destination node, and a link quality between the source node and the destination node.

The change of the relay operation type may include a change from a link cooperating type to a link switching type and vice-versa. A case of the change from the link cooperating type to the link switching type may be classified into cases where a direct link has a problem and a case where a relay link has a problem.

When the change of the relay operation type is determined, the apparatus for wideband short-range wireless communication may perform signaling for changing an operation. The source node, the relay node, and the destination node may perform different functions based on whether the link cooperating type and the link switching type is determined to be used. Thus, when the relay operation type is to be changed, the source node, the relay node, and the destination node may prepare for a change of operation type. Whether the change of operation is approved may be determined to be performed depending on a condition of each node. Accordingly, the source node, the relay node, and the destination node may recognize whether the change of operation is approved through signaling for changing an operation.

In operation 620, the apparatus for wideband short-range wireless communication may transmit an ROC request message.

In response to a change to the link switching type due to a problem occurring at the direct link in the link cooperating type, the apparatus for wideband short-range wireless communication may transmit the ROC request message to the relay node to use the relay link.

In response to a change to the link switching type due to a problem occurring at the relay link in the link cooperating type, the apparatus for wideband short-range wireless communication may transmit the ROC request message to the destination node to use the direct link.

In response to a change to the link cooperating type due to an event occurring in the link switching type, the apparatus for wideband short-range wireless communication may transmit the ROC request message to the relay node to use both of the direct link and the relay link.

In this instance, the ROC request message may be configured by an action frame, and the link cooperating type or the link switching type may be set through a link cooperating bit field among relay cooperation type fields of the action frame. In response to a change to the link switching type among the relay cooperation type fields, whether a link switching starts at the relay link or whether the link switching starts at the direct link may be set through a relay link bit field.

In operation 630, the apparatus for wideband short-range wireless communication may receive an ROC response message corresponding to the ROC request message.

In response to a change to the link switching type due to a problem occurring at the direct link in the link cooperating type, the apparatus for wideband short-range wireless communication may receive the ROC response message from the relay node. The relay node may receive the ROC response message from the destination node and transfer the ROC response message to the source node.

In response to a change to the link switching type due to a problem occurring at the relay link in the link cooperating type, the apparatus for wideband short-range wireless communication may receive the ROC response message from the destination node.

In response to a change to the link cooperating type due to an event occurring in the link switching type, the apparatus for wideband short-range wireless communication may receive the ROC response message from the relay link.

In the ROC response message, whether a change of a relay operation of a node used in the link switching type or the link cooperating type may be set through a status code bit field. A bit corresponding to each of an approval or a rejection may be set to the status code bit field.

In operation 640, the apparatus for wideband short-range wireless communication may determine whether a change of the relay operation type is approved through the ROC response message. In response to an approval to the change of the relay operation type, a data frame may be transmitted with respect to a related node.

When the relay operation type is changed to the link switching type due to a problem occurring at the direct link in the link cooperating type and the change to the link switching type is approved, the apparatus for wideband short-range wireless communication may transmit a data frame to the relay node.

When the relay operation type is changed to the link switching type due to a problem occurring at the relay link in the link cooperating type and the change to the link switching type is approved, the apparatus for wideband short-range wireless communication may transmit a data frame to the destination node.

When the relay operation type is changed to the link cooperating type due to an event occurring in the link switching type and the change to the link cooperating type is approved, the apparatus for wideband short-range wireless communication may transmit a data frame to the relay node and the destination node. In this instance, in response to an approval to the change of the relay operation, the apparatus for wideband short-range wireless communication may determine whether a TPA is performed among the source node, the relay node, and the destination node and may perform the TPA when the TPA is not performed. Even before the approval to the change of the relay operation, the apparatus for wideband short-range wireless communication may determine whether a TPA is performed between the relay node and the destination node and may perform the TPA when the TPA is not performed.

The apparatus for wideband short-range wireless communication may receive a link measurement report frame from the relay node. The link measurement report frame may include a first link margin element and a second link margin element. The first link margin element may indicate link quality information between the source node and the relay node measured at the relay node, and the second link margin element may indicate link quality information between the relay node and the destination node measured at the relay node.

The apparatus for wideband short-range wireless communication may change a modulation and coding scheme used for transmitting a frame to the relay node and the destination node based on the link quality information between the source node and the relay node and the link quality information between the relay node and the destination node. The apparatus for wideband short-range wireless communication may modulate and code a frame in a scheme appropriate to a link quality according to a link quality of the relay link.

The apparatus for wideband short-range wireless communication may signal the change of the relay operation type by adding a link cooperating bit field and a relay link bit field to header information of a data frame to be transmitted and transmitting a data frame without signaling of a predetermined ROC request and response message. Thus, an interruption of a data frame transfer due to a signaling of a message may be prevented.

Figure 7:
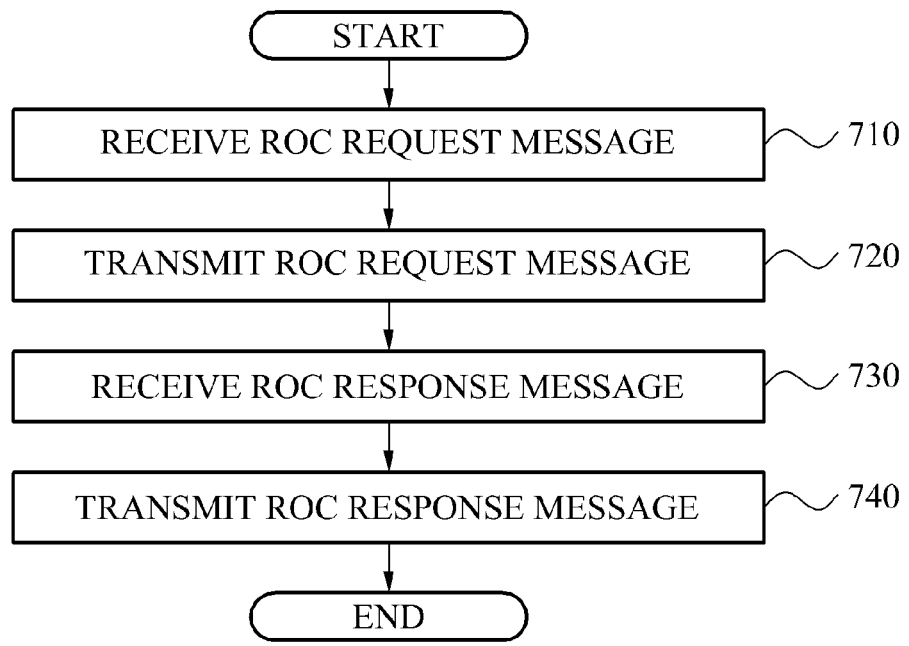
FIG. 7 is a flowchart illustrating a method for wideband short-range wireless communication viewed from a relay node.

FIG. 7 is a flowchart illustrating a method for wideband short-range wireless communication viewed from a relay node. In FIG. 7, an apparatus for wideband short-range wireless communication may correspond to a relay node of a wideband short-range wireless communication system.

Here, the apparatus for wideband short-range wireless communication may be used for determining a change to a link switching type due to an occurrence of a problem at a direct link in a link cooperating type and for determining a change to the link cooperating type due to an occurrence of an event in the link switching type.

In operation 710, the apparatus for wideband short-range wireless communication may receive an ROC request message from a source node.

In operation 720, the apparatus for wideband short-range wireless communication may transmit an ROC request message to a destination node.

In operation 730, the apparatus for wideband short-range wireless communication may receive an ROC response message corresponding to the ROC request message from the destination node.

In operation 740, the apparatus for wideband short-range wireless communication may transmit the response message to the source node.

The apparatus for wideband short-range wireless communication may transfer the ROC request message and the ROC response message between the source node and the destination node.

The apparatus for wideband short-range wireless communication may measure a link quality between the source node and the relay node and a link quality between the relay node and the destination node. The apparatus for wideband short-range wireless communication may transmit a link measurement report frame to the source node. The link measurement report frame includes a first link margin element, indicating link quality information between the source node and the relay node, and a second link margin element, indicating link quality information between the relay node and the destination node.

Figure 8:
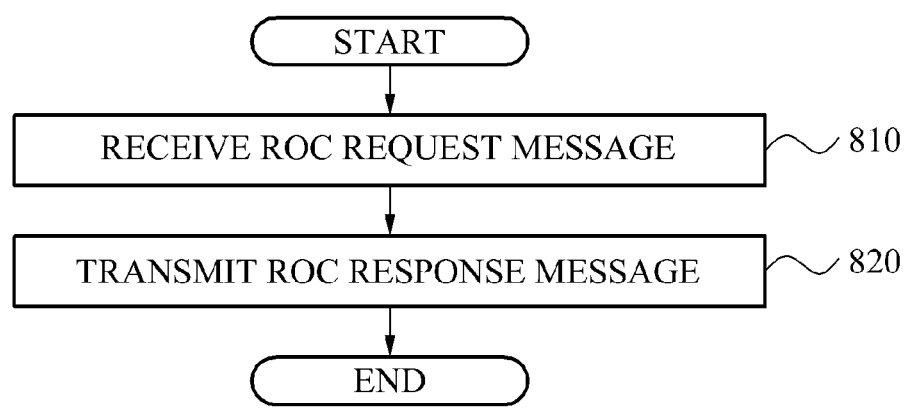
FIG. 8 is a flowchart illustrating a method for wideband short-range wireless communication viewed from a destination node.

FIG. 8 is a flowchart illustrating a method for wideband short-range wireless communication viewed from a destination node. In FIG. 8, an apparatus for wideband short-range wireless communication may correspond to a destination node of a wideband short-range wireless communication system.

In operation 810, the apparatus for wideband short-range wireless communication may receive an ROC request message.

In response to a change to a link switching type due to a problem occurring at a direct link in a link cooperating type, the apparatus for wideband short-range wireless communication may receive the ROC request message from a relay node.

In response to a change to the link switching type due to a problem occurring at a relay link in the link cooperating type, the apparatus for wideband short-range wireless communication may receive the ROC request message from a source node.

In response to a change to a link cooperating type due to an event occurring in the link switching type, the apparatus for wideband short-range wireless communication may receive the ROC request message from the relay node.

In operation 820, the apparatus for wideband short-range wireless communication may transmit an ROC response message.

In response to a change to the link switching type due to a problem occurring at the direct link in the link cooperating type, the apparatus for wideband short-range wireless communication may determine whether a change to the link switching type is approved and may transmit the ROC response message to the relay node.

In response to a change to the link switching type due to a problem occurring at the relay link in the link cooperating type, the apparatus for wideband short-range wireless communication may determine whether a change to the link switching type is approved and may transmit the ROC response message to the source node.

In response to a change to the link cooperating type due to an event occurring in the link switching type, the apparatus for wideband short-range wireless communication may determine whether a change to the link cooperating type is approved and may transmit the ROC response message to the relay node.

Figure 9:
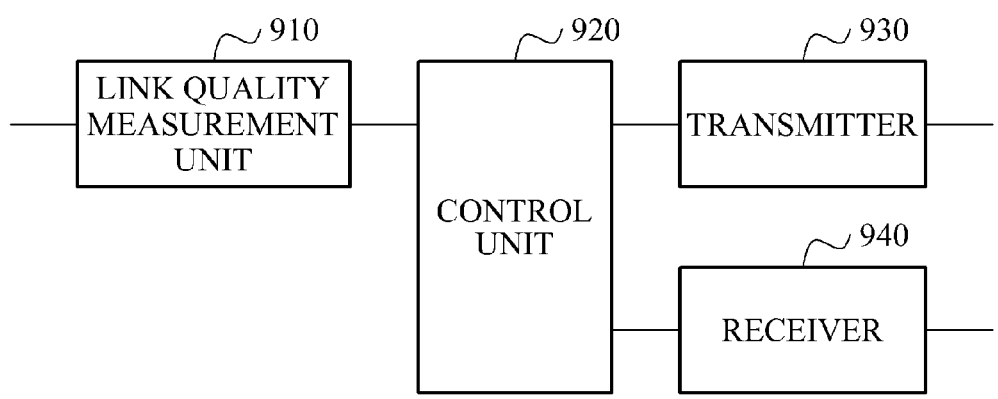
FIG. 9 is a block diagram of an apparatus for wideband short-range wireless communication.

FIG. 9 is a block diagram of an apparatus for wideband short-range wireless communication. Referring to FIG. 9, the apparatus for wideband short-range wireless communication may include a link quality measurement unit 910, a control unit 920, a transmitter 930, and a receiver 940.

The link quality measurement unit 910 may measure a link quality between a source node and a relay node, a link quality between the relay node and a destination node, and a link quality between the source node and the destination node.

The control unit 920 may determine a change of a relay operation type. When the control unit 920 does not receive an ACK frame from the destination node for a predetermined period of time, the control unit 920 may determine a change of the relay operation type based on the link quality between the source node and the relay node, the link quality between the relay node and the destination node, and the link quality between the source node and the destination node.

In response to an occurrence of a problem at the direct link or the relay link while operating in the link cooperating type, the control unit 920 may determine to change the relay operation type to the link switching type. In this instance, the problem occurring at the direct link or the relay link may indicate a case where a signal is incapable of being transmitted between the source node and the destination node or a link quality deteriorates in comparison with a predetermined level.

In response to an occurrence of an event while operating in the link switching type, the control unit 920 may determine to change the relay operation type to the link cooperating type. In this instance, the occurrence of an event may include a passage of time preset to a timer. In response to the passage of time preset to the timer, the control unit 920 may determine to change the relay operation type from the link switching type to the link cooperating type. The occurrence of an event may include a case where a link switching between the relay link and the direct link occurs frequently in comparison with a predetermined level.

The control unit 920 may determine whether a beamforming process is performed among the source node, the relay node, and the destination node, and may determine to perform the beamforming process when the beamforming process is not performed.

When the beamforming process is performed in the link cooperating type before the relay operation type is changed to the link switching type, the control unit 920 may reuse a value of a beamforming parameter acquired in the link cooperating type. The control unit 920 may use the timer to reuse a previously acquired value of a beamforming parameter when a change of the relay operation type from the link switching type to the link cooperating type is determined before a passage of a predetermined period of time set to the timer. When a change of the relay operation type from the link switching type to the link cooperating type is determined after the predetermined period of time set to the timer passes, the control unit 920 may re-perform a beamforming process to acquire a new value of the beamforming parameter.

The control unit 920 may determine whether a TPA is performed among the source node, the relay node, and the destination node, and may determine to perform the TPA when the TPA is not performed.

When the TPA is performed in the link cooperating type before the relay operation type is changed to the link switching type, the control unit 920 may reuse a value of a TPA parameter acquired in the link cooperating type. The control unit 920 may use a timer to reuse a previously acquired value of the TPA parameter when the change of the relay operation type from the link switching type to the link cooperating type is determined before a predetermine period of time set to the timer passes. When a change of the relay operation type from the link switching type to the link cooperating type is determined after the predetermined period of time set to the timer passes, the control unit 920 may re-perform a TPA to acquire a new value of the TPA parameter.

The control unit 920 may change a modulation and coding scheme used for transmitting a frame to the relay node and the destination node based on link quality information between the source node and the relay node and link quality information between the relay node and the destination node.

In response to a determination of a change of the relay operation type, the transmitter 930 may transmit an ROC request message.

In response to a change of the relay operation type to the link switching type due to an occurrence of a problem at the direct link in the link cooperating type, the transmitter 930 may transmit the ROC request message to the relay node to use the relay link.

In response to a change of the relay operation type to the link switching type due to an occurrence of a problem at the relay link in the link cooperating type, the transmitter 930 may transmit the ROC request message to the destination node to use the direct link.

In response to a change of the relay operation type to the link cooperating type due to an occurrence of an event in the link switching type, the transmitter 930 may transmit the ROC request message to the relay node to use both of the direct link and the relay link.

The receiver 940 may receive an ROC response message corresponding to the ROC request message.

When a problem occurs at the direct link in the link cooperating type and the relay operation type is changed to the link switching type, the receiver 940 may receive the ROC response message from the relay node. The relay node may receive the ROC response message from the destination node and transfer the ROC response message to the source node. In this instance, in response to an approval to the change to the link switching type, the transmitter 930 may transmit a data frame to the relay node.

When a problem occurs at the relay link in the link cooperating type and the relay operation type is changed to the link switching type, the receiver 940 may receive the ROC response message from the destination node. In this instance, in response to an approval to the change to the link switching type, the transmitter 930 may transmit a data frame to the destination node.

When an event occurs in the link switching type and the relay operation type is changed to the link cooperating type, the receiver 940 may receive the ROC response message from the relay node. In this instance, in response to an approval to the change to the link cooperating type, the transmitter 930 may transmit a data frame to the relay node and the destination node.

The receiver 940 may receive a link measurement report frame from the relay node.

The method for wideband short-range wireless communication according to the above-described embodiments may be recorded in non-transitory computer-readable media including program instructions to implement various operations embodied by a computer. The media may also include, alone or in combination with the program instructions, data files, data structures, and the like. Examples of program instructions include both machine code, such as produced by a compiler, and files containing higher level code that may be executed by the computer using an interpreter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method for wireless communication from a source node to a destination node, the method comprising:
    determining, by the source node, a change of a relay operation type when a signal is incapable of being transmitted through one of a direct link between the source node and the destination node and a relay link between the source node and the destination node via a relay node, or when a link quality deteriorates in comparison with a predetermined criterion at one of the direct link and the relay link;
    transmitting, by the source node, a relay operation change (ROC) request message in response to a determination of the change of the relay operation type; and
    receiving, by the source node, an ROC response message corresponding to the ROC request message, wherein
        the change of the relay operation type is either a change from a link cooperating type to a link switching type, or a change from the link switching type to the link cooperating type,
        the link cooperating type is a type in which the source node communicates same data with the destination node simultaneously both via a direct link and via a relay link though the relay node,
        the link switching type is a type in which the source node communicates with the destination node either via the direct link or via the relay link, and
        the source node transmits the ROC request message through the other of the direct link and the relay link in the link cooperating type, and through the relay link in the link switching type regardless of whether the direct link or the relay link is used in the link switching type.

2. The method of claim 1, wherein:
    the determining comprises changing the relay operation type to the link switching type when the signal is incapable of being transmitted through the direct link or the link quality deteriorates in comparison with the predetermined criterion at the direct link while operating in the link cooperating type,
    the transmitting comprises transmitting the ROC request message to the relay node, and
    the receiving comprises receiving the ROC response message, including whether the change of the relay operation type of the destination node and the relay node is approved, from the relay node.

3. The method of claim 2, wherein:
    the ROC request message includes a relay operation type field, of which a link cooperating bit field is set to "0" and a relay link bit field is set to "1," and
    the ROC response message includes a status code field, of which a bit is set to indicate whether the change of the relay operation type of the destination node and the relay node is approved.

4. The method of claim 3, further comprising:
    transmitting a data frame to the relay node when the change of the relay operation type is approved.

5. The method of claim 1, wherein:
    the determining comprises changing the relay operation type to the link switching type when the signal is incapable of being transmitted through the relay link or the link quality deteriorates in comparison with the predetermined criterion at the relay link while operating in the link cooperating type,
    the transmitting comprises transmitting the ROC request message to the destination node, and
    the receiving comprises receiving the ROC response message, including whether the change of the relay operation type is approved, from the destination node.

6. The method of claim 5, wherein:
    the ROC request message includes a relay operation type field, of which a link cooperating bit field is set to "0" and a relay link bit field is set to "0," and
    the ROC response message includes a status code field, of which a bit is set to indicate whether the change of the relay operation type of the destination node is approved.

7. The method of claim 6, further comprising:
    transmitting a data frame to the destination node when the change of the relay operation type is approved.

8. The method of claim 1, wherein:
    the determining comprises changing the relay operation type to the link cooperating type while operating in the link switching type,
    the transmitting comprises transmitting the ROC request message to the relay node, and
    the receiving comprises receiving the ROC response message, including whether the change of the relay operation type of the destination node and the relay node is approved, from the relay node.

9. The method of claim 8, wherein:
    the ROC request message includes a relay operation type field, of which a link cooperating bit field is set to "1," and
    the ROC response message includes a status code field of which a bit is set to indicate whether the change of the relay operation type of the destination node and the relay node is approved.

10. The method of claim 9, further comprising:
    transmitting a data frame to the relay node and the destination node based on a scheme of the link cooperating type when the change of the relay operation type is approved.

11. The method of claim 9, wherein the destination node has an antenna pattern set to be simultaneously directed to the relay node and the source node to simultaneously receive data frames from the source node and the relay node.

12. The method of claim 1, further comprising:
    receiving a link measurement report frame from the relay node,
    wherein the link measurement report frame includes a first link margin element, indicating link quality information between the source node and the relay node, and a second link margin element, indicating link quality information between the relay node and the destination node.

13. The method of claim 12, further comprising:
    changing a modulation and coding scheme used for transmitting a frame to the relay node and the destination node based on the link quality information between the source node and the relay node and the link quality information between the relay node and the destination node.

14. A method for wireless communication from a source node to a destination node, the method comprising:
    receiving, by a relay node, a relay operation change (ROC) request message from the source node in response to a determination of a change of a relay operation type, wherein the change of the relay operation type is determined when a signal is incapable of being transmitted through a direct link between the source node and the destination node and a relay link between the source node and the destination node via the relay node, or when a link quality deteriorates in comparison with a predetermined criterion at one of the direct link and the relay link;

transmitting, by the relay node, the received ROC request message to a destination node;

receiving, by the relay node, an ROC response message, corresponding to the ROC request message, from the destination node; and transmitting, by the relay node, the received ROC response message to the source node, wherein the change of the relay operation type is either a change from a link cooperating type to a link switching type, or a change from the link switching type to the link cooperating type, the link cooperating type is a type in which the source node communicates same data with the destination node simultaneously both via a direct link and via a relay link though the relay node, the link switching type is a type in which the source node communicates with the destination node either via the direct link or via the relay link though the relay node, and the source node transmits the ROC request message through the other of the direct link and the relay link in the link cooperating type, and through the relay link in the link switching type regardless of whether the direct link or the relay link is used while operating in the link switching type.

15. The method of claim 14, further comprising:

measuring a link quality between the source node and the relay node and a link quality between the relay node and the destination node; and transmitting, to the source node, a link measurement report frame including a first link margin element indicating link quality information between the source node and the relay node and a second link margin element indicating link quality information between the relay node and the destination node.

16. A method for wireless communication from a source node to a destination node, the method comprising:

receiving, by the destination node, a relay operation change (ROC) request message in response to a determination of a change of a relay operation type, wherein the change of the relay operation type is determined when a signal is incapable of being transmitted through one of a direct link between the source node and the destination node and a relay link between the source node and the destination node via a relay node, or when a link quality deteriorates in comparison with a predetermined criterion at one of the direct link and the relay link; and transmitting, by the destination node, an ROC response message corresponding to the ROC request message, wherein the change of the relay operation type is either a change from a link cooperating type to a link switching type, or a change from the link switching type to the link cooperating type, the link cooperating type is a type in which a source node communicates same data with the destination node simultaneously both via a direct link and via a relay link though a relay node, the link switching type is a type in which the source node communicates with the destination node either via the direct link or via the relay link though the relay node, and the ROC request message is transmitted by the source node through the other of the direct link and the relay link in the link cooperating type, and through the relay link in the link switching type regardless of whether the direct link or the relay link is used in the link switching type.

17. The method of claim 16, wherein the receiving comprises:

receiving the ROC request message from the relay node when the relay operation type is determined to be changed from the link cooperating type to the link switching type due to an incapability of transmitting the signal through the direct link between the source node and the destination node or due to a deterioration in the link quality in comparison with the predetermined criterion at the direct link, and receiving the ROC request message from the source node when the relay operation type is determined to be changed from the link cooperating type to the link switching type due to an incapability of transmitting the signal through the relay link among the source node, the relay node, and the destination node or due to a deterioration in the link quality in comparison with the predetermined criterion at the relay link.

18. The method of claim 16, wherein the receiving comprises receiving the ROC request message from the relay node when the relay operation type is determined to be changed from the link switching type to the link cooperating type.

19. The method of claim 16, wherein the transmitting comprises:

transmitting the ROC response message to the relay node when the relay operation type is determined to be changed from the link cooperating type to the link switching type due to an incapability of transmitting the signal through the direct link between the source node and the destination node or due to a deterioration in the link quality in comparison with the predetermined criterion at the direct link, and transmitting the ROC response message to the source node when the relay operation type is determined to be changed from the link cooperating type to the link switching type due to an incapability of transmitting the signal through the relay link among the source node, the relay node, and the destination node or due to a deterioration in the link quality in comparison with the predetermined criterion at the relay link.

20. The method of claim 16, wherein the transmitting comprises transmitting the ROC response message to the relay node when the relay operation type is determined to be changed from the link switching type to the link cooperating type.

* * * * *